United States Patent Office 2,813,473
Patented Nov. 19, 1957

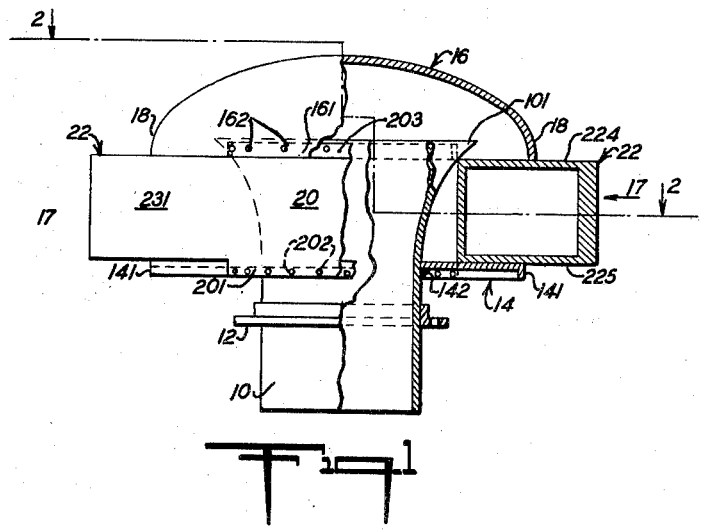
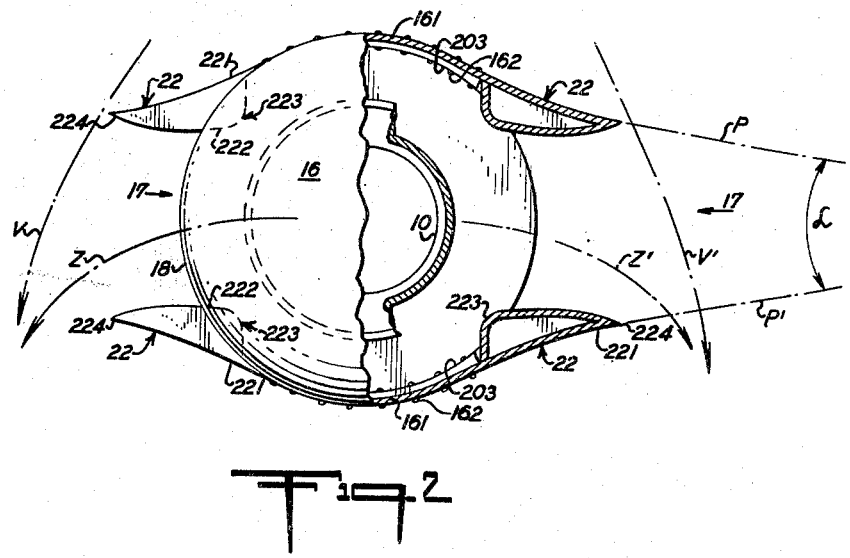

2,813,473
VENTILATOR

Joseph Schepens, Termonde, Belgium

Application November 24, 1953, Serial No. 394,115

Claims priority, application Belgium January 29, 1953

1 Claim. (Cl. 98—20)

The present invention relates to ventilators for vehicles and especially for railway coaches, tramcars, trolley buses, omnibuses and the like and has for its object to provide a ventilator which will be effective in operation irrespective of the direction of motion of the vehicle and which is of simple and economic construction.

According to the invention the ventilator comprises an open ended vent member for connecting the space to be ventilated with the outer atmosphere, a protective cap or cover for the upper open end of said vent member, lateral apertures in said protective cap or cover and laterally projecting vanes fore and aft of said protective cap, the shape and dimensions of said vanes being so chosen that air flowing past the ventilator will create a zone of low pressure or partial vacuum between the baffles.

In a preferred embodiment of the invention the protective cap or cover is dome shaped and closed on all sides except for the two lateral apertures and the walls of the protective cap fore and aft of the apertures form the baffles, the laterally projecting vanes being integral with or connected to the edges of said walls.

In order that the invention may be more clearly understood one particular embodiment thereof will now be described, by way of example, with reference to the accompanying drawings wherein, Figure 1 is an elevation in part section and Figure 2 a plan view in part section of the ventilator.

Referring to these drawings the ventilator comprises an open ended tubular vent member 10 for connecting the space to be ventilated with the outer atmosphere. The upper end of the tubular vent member 10 may be flared at 101, as shown in dotted lines in Figure 1, and provided intermediate its open ends with a radial flange 12 by means of which the ventilator is adapted to be fixed to the roof of a vehicle. Above the flange 12 the tubular member passes through a disc 14 to which it is securely attached, for example by welding, and which serves as a supporting base for the upper part of the ventilator. Supported by the base 14 is a dome-shaped protective cap or cover 16 for covering the upper open flared end 101 of the tubular member 10 and thus preventing dust or water from passing into said tubular member. The cap or cover 16 and the supporting disc 14 completely enclose the upper open flared end 101 of the tubular vent member 10 except for two lateral apertures 17 formed in the side walls 18 of the cap or cover 16. The walls 20 of the cap or cover 16 fore and aft of the said lateral apertures 17 constitute baffles for diverting the air flow around the sides of the ventilator. The air flow is further diverted by means of vanes 22 connected to or integral with the edges of the walls 20. Thus there are four vanes 22 arranged one on each side of each of the lateral apertures 17 in the walls 18.

In the drawing, the deflecting vanes 22 each possess two faces 221 and 222 which have in horizontal cross-section a suitably curved contour, whereas the vertical cross-section of the vanes 22 is rectangular. The outer faces 221 which are slightly concave to the outside merge into the outer convex surface of the lateral wall 20 of the cap 16. These outer faces 221 are formed in such a manner that the planes P, P' tangent to them at their free ends form between them a sharp angle.

In horizontal section, the interior faces 222 of the deflecting vanes 22 joined to the interior surface of the circumferential wall of the cap 16 form portions 223 projecting inside the cap 16, and joining thereafter the exterior surfaces 222 in such a manner as to obtain between the inner faces 223 passage openings 17 which as they extend from inside the cap 16 to the outside, first slightly converge and then slightly diverge to the outside.

The operation of the device is as follows: when the vehicle is in motion, in the direction of the arrow X, the air current resulting therefrom is divided by the fore portion of wall 20 and the corresponding vanes 22 into two streams V, V' thus generating very intense suction from the tubular vent member 10 through cap 16 to the outside according to arrows Z, Z'.

Thus the two vanes 22 bounding each aperture 17 constitute a nozzle or Venturi defined by their inner walls 222, by reason of the airfoil cross-section of the vanes, the airfoils having leading edges 223, upper surfaces 222, lower surfaces 221 and trailing edges 224.

The walls 20 are fixed at their lower edges 201 to the downwardly bent edge 141 of the bottom wall 14, for example by rivets 202. The wall 14 is fixed to the tube 10 by a weld 142. The cap 16 is fixed at its lower edge 161 to the inwardly and then upwardly bent edges 203 of the walls 20 by rivets 162. Each of the vanes 22 has its outer wall 221 bent from the corresponding wall 20 of the cap 16 and its inner wall 222 either reverse bent from a continuation of the same wall 20, if the material is thin enough to permit such fabrication step, or constituted by a separate piece welded to outer wall 221. The top and bottom walls 224 and 225 of each vane 22 are welded to the upper and lower edges of the walls 221 and 222.

It will be understood that the ventilator may be made of any suitable material, such as for example sheet metal, and that the cap D may be of any convenient shape.

I claim:

A static ventilator for vehicles comprising a tubular vent member having one end connected to the space to be ventilated and a free end, a cap member spaced from said free end and positioned substantially coaxially therewith, a circumferential wall secured hermetically to said cap member and surrounding said free end to define with said vent member a free annular space, a bottom wall secured hermetically to said circumferential wall and to said vent member at a distance from said free end, said circumferential wall having two diametrically opposed openings therein connecting said annular space to the atmosphere, each of said openings being provided with two deflecting vanes extending outwardly therefrom between said cap member and bottom wall, said vanes being of airfoil section defining leading edges in said annular space, trailing edges outside said circumferential wall, aerodynamic upper surfaces bounding the two sides of said opening between said cap member and bottom wall, and aerodynamic lower surfaces merging into said circumferential wall, thereby to define a converging-diverging passageway at each opening.

References Cited in the file of this patent

UNITED STATES PATENTS

| 64,229 | Kingsborough | Apr. 30, 1867 |
| 1,275,211 | Breidert | Aug. 13, 1918 |
| 1,772,677 | Mussey | Aug. 12, 1930 |
| 2,235,211 | Gemenden | Mar. 18, 1941 |

FOREIGN PATENTS

| 22,087 | Great Britain | 1898 |
| 388,557 | Great Britain | Mar. 2, 1933 |